United States Patent [19]

Chen

[11] 3,869,068
[45] Mar. 4, 1975

[54] DILUTER PROBE ASSEMBLY
[75] Inventor: Bu Shing Chen, Coral Gables, Fla.
[73] Assignee: Hyperion Incorporated, Miami, Fla.
[22] Filed: June 6, 1974
[21] Appl. No.: 477,152

[52] U.S. Cl. ................... 222/148, 23/292, 73/425.6, 141/25, 141/90, 222/481
[51] Int. Cl. ............................................. G01n 1/10
[58] Field of Search ..... 73/425.4 R, 425.4 P, 425.6; 141/25, 90; 23/253, 259, 292; 222/148, 481, 492, 493, 496

[56] References Cited
UNITED STATES PATENTS

| | | | |
|---|---|---|---|
| 3,334,788 | 8/1967 | Hamilton | 73/425.6 UX |
| 3,719,087 | 3/1973 | Thiers | 73/425.6 |
| 3,740,041 | 6/1973 | Jones | 222/148 X |
| 3,764,041 | 10/1973 | Noll | 23/259 X |

Primary Examiner—Robert B. Reeves
Assistant Examiner—David A. Scherbel
Attorney, Agent, or Firm—Kenway & Jenney

[57] ABSTRACT

The diluter probe assembly disclosed herein employs a pressure-responsive valve which allows the diluter to aspirate a small quantity of a sample liquid through a needle-like capillary probe and to then discharge a relatively large volume of diluent through an outer conduit surrounding the needle-like probe.

8 Claims, 2 Drawing Figures

DILUTER PROBE ASSEMBLY

BACKGROUND OF THE INVENTION

This invention relates to an automatic diluter and more particularly to a diluter which permits aspiration of a very small sample and subsequent dilution of the sample at very high ratios.

Automatic diluters are available which provide for the aspiration of a predetermined quantity of a sample liquid followed by the discharge of the measured sample together with a predetermined quantity of diluent. Such dilution steps are frequently performed as a part of standardized chemical analysis procedures. One such diluter is that disclosed in U.S. Pat. No. 3,655,094, issued on Apr. 11, 1972 to James C. Hobbs, II, entitled Method and Apparatus For Measuring and Proportioning Fluids. In such diluters, the aspiration and discharge are provided through a common conduit. Heretofore, however, the dilution ratio achievable with such automatic diluters has been effectively limited, requiring for some procedures that dilution be performed on a two-step basis. The limitation arises through the conflicting requirements placed upon the single conduit. In order to accurately measure a small sample volume, the diluter probe is preferably of relatively small diameter, e.g. formed of hypodermic syringe tubing, while the rate of flow desired for a comparatively large volume of diluent is beyond that practical with such small tubing sizes.

Among the several objects of the present invention may be noted the provision of a probe assembly for an automatic diluter which facilitates the aspiration of a relatively small sample while permitting the rapid discharge of a relatively large volume of diluent; the provision of such a probe assembly which requires no modification of conventional diluters using a common conduit both for sample aspiration and diluent discharge; the provision of such a probe assembly which operates automatically; the provision of such an assembly which is highly reliable and which is of relatively simple and inexpensive construction. Other objects and features will be in part apparent and in part pointed out hereinafter.

SUMMARY OF THE INVENTION

Briefly, a probe assembly in accordance with the present invention is adapted for use with a diluter of the type which, through a common conduit, aspirates to draw in a relatively small sample and then discharges a relatively large quantity of diluent. The probe assembly includes an outlet member having therein a port which is connected to the common diluter conduit. An outer probe conduit is connected to the outlet member peripherally of the port. An inner conduit member is provided which includes a needle-like portion extending through and below the lower end of the outer probe conduit. The upper end of the inner conduit is substantially larger than the needle-like lower portion and is provided with means for forming a seal to the outlet member around the port, the inner conduit member being biased resiliently upward into sealing engagement with the outlet member. Accordingly, when the pressure at the port, during discharge of the diluent, overcomes the resilient bias, diluent can flow through the outer probe conduit around the inner probe conduit at flow rates substantially exceeding those possible through the needle-like portion of the inner conduit.

BRIEF DESCRIPTION OF THE DRAWINGS

Corresponding reference characters indicate corresponding parts throughout the several views of the drawings.

DESCRIPTION OF THE PREFERRED EMBODIMENTS

Figures 1, 2:
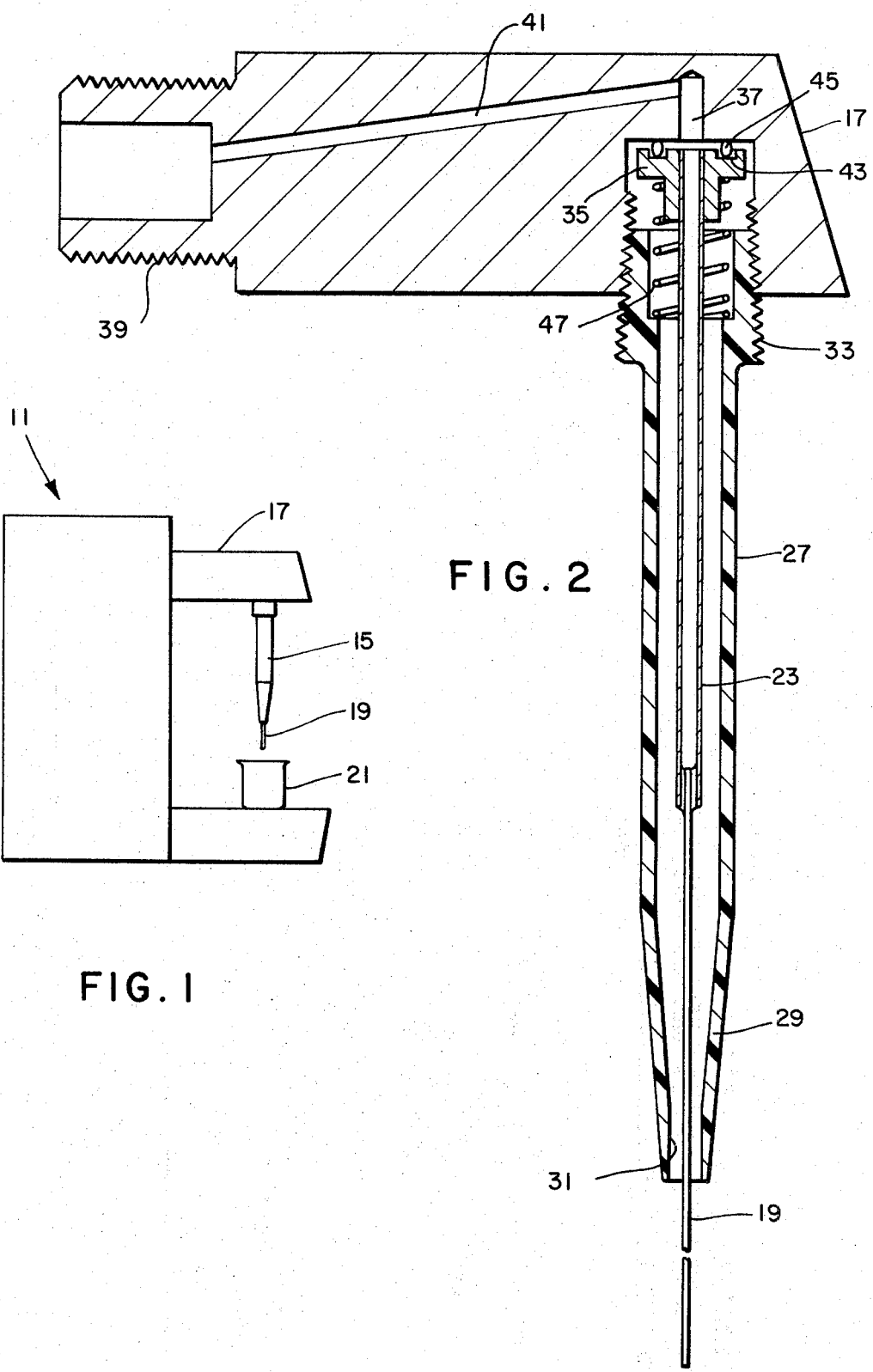
FIG. 1 is a side view, in elevation, of an automatic diluter employing a probe in accordance with the present invention.
FIG. 2 is a side view, to enlarged scale and with parts broken away, of the probe of the present invention.

Referring now to FIG. 1, there is indicated at 11 generally an essentially conventional automatic diluter. This diluter may, for example, be the model 703-106 sold by Cordis Corporation of Miami, Fla. As is understood by those skilled in the art, such a diluter typically comprises a plurality of positive displacement pump chambers, e.g. operated by appropriate cams, together with suitable valving and means for coupling at least one of the pump chambers to a supply of the particular diluent required. In the particular example illustrated and for the purpose of explanation, it may be assumed that the diluter 11 is configured to aspirate a volume of 6.6 microliters, i.e., for the purpose of drawing in a sample, and to then discharge 20 milliliters of diluent together with the sample, both aspiration and discharge of diluent appearing through a common conduit or port opening through the front face of the machine.

The probe assembly of the present invention comprises the probe itself, designated 15, which is coupled to the diluter output conduit or port by means of an outlet member 17. This outlet member may be considered a continuation or extension of the common conduit. As may be seen, the probe 17 is directed downwardly and terminates in a needle-like tip 19 appropriate for aspirating a sample of relatively small volume, e.g. the 6.6 microliter quantity discussed previously. After the sample is taken in, the diluter operates as described in greater detail hereinafter to discharge the sample, together with a substantially larger quantity of diluent, e.g. 20 milliliters, the sample and the diluent being collected in a mixing cup 21 as illustrated.

Referring now to FIG. 2 where the probe itself is illustrated to larger scale and in greater detail, the needle-like tip 19 comprises a length of hypodermic tubing, the gauge and length of this tubing being selected so that its interior volume corresponds to and somewhat exceeds the preselected sample volume. The relatively small diameter of the tubing 19 allows the volume of the sample to be quite accurately controlled, since discharge from the tubing will occur only under pressure and no substantial mixing will occur within the tubing at any interface between diluent and sample. However, as will also be understood, the small diameter of this tubing offers a very significant obstruction or restriction to high flow rates so that it is not practical to drive a large quantity of diluent through this small diameter or needle-like tubing.

The hypodermic tubing 19 is connected to a second tube 23 which is of larger diameter, e.g. by brazing, which tubing extends essentially to the top of the probe. Both the tubing 19 and the tubing 23 may, for example, be of stainless steel. At the upper end of the tubing 23, a flanged plastic cap 35 is attached to the tube as illustrated. Cap 35 surrounds but does not close off the upper end of the tubing 23. Cap 35 may be constructed of teflon, in which case a force fit of the tubing 23 in the central aperture of the cap will provide sufficient retention. The tubings 19 and 23 together with the cap 35 are considered herein to comprise an inner probe conduit, designated generally as 26.

As may be seen in FIG. 2, the inner probe conduit 26 passes down through the interior of an outer probe conduit, designated 27. Over most of its length, the outlet conduit 27 is greatly larger than the inner conduit but at its lower end, tapers, as indicated at 29, so as to provide an outlet 31 through which the needle-like probe tip 19 passes with substantial clearance. At its upper end, the outer probe conduit 27 is provided with a threaded portion 33 which is of larger diameter than the main portion of the outer conduit and which screws into the outlet member 17 as indicated.

Outlet member 17 provides an outlet port 37 which opens downwardly and is concentric with the inner and outer probe conduits. The outlet member itself is mounted on the diluter proper by means of a threaded portion 39, the port 37 being coupled to the common diluter conduit through a passage 41 extending through the body of the outlet member 17.

Cap 35 is provided with an annular groove 43 which holds an O-ring 45 adapted to seal the cap 35, together with the tubing 23, to the outlet port 37. The cap 35 is biased upwardly against the port 37 so that this seal is normally established in which case the port 37 communicates only with the inner probe conduit. It can therefore be seen that, during aspiration, the drawing in of sample liquid will occur only through the inner probe conduit. Thus, a precisely predetermined quantity of the sample can be drawn up through the needle-like tubing 19.

During the discharge of diluent, however, the flow path from port 37 is not limited to the inner probe conduit. While the increase in pressure at the outlet port 37 during discharge will cause some of the diluent to flow through the inner probe, driving the sample ahead of it, the increased pressure will also overcome the force of the spring 47 so that flow can occur around the cap 35 and down through the outer probe conduit 27, outside of the inner conduit. As this path is of much greater cross-section than the bore of the needle-like inner probe tip 19, a substantial volume of diluent can be discharged in a reasonable time. Thus, relatively high ratios of dilution can be obtained in a single dilution step.

The discharge of diluent over the outside of the inner probe 19, together with the flow of some diluent through the inner probe, have the further advantage that the needle-like probe portion itself tends to be thoroughly washed and cleansed of any sample residue. Thus, contamination from one sample to another is prevented.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A probe assembly for use with a diluter of the type which, through a common conduit, aspirates to draw a relatively small sample and then discharges a relatively large quantity of diluent, said probe assembly comprising:

an outlet member having therein a port which is connected to the common diluter conduit;

an outer probe conduit connected to said outlet member peripherally of said port;

an inner probe conduit member including a needle-like portion extending through and below the lower end of said outer conduit, the upper end of said inner conduit member being of substantially larger diameter than said needle-like portion and being provided with means for forming a seal to said outlet member around said port; and means for resiliently biasing said inner conduit member upwardly into sealing engagement with said outlet member, whereby, when the pressure at said port during discharge of diluent overcomes said resilient means, diluent can flow through said outer conduit around said inner conduit at flow rates exceeding those possible through said needle-like portion of said inner conduit.

2. A probe assembly as set forth in claim 1 wherein said outer probe conduit tapers at its lower end to an inner diameter which fits loosely around said needle-like portion of said inner probe conduit member.

3. A probe assembly as set forth in claim 1 wherein the lower end of said inner probe member comprises a length of hypodermic syringe tubing.

4. A probe assembly as set forth in claim 3 wherein the upper portion of said inner probe conduit member comprises a length of tubing of diameter significantly larger than said hypodermic tubing.

5. A probe assembly as set forth in claim 4 wherein the upper portion of said outer probe conduit is of substantially larger diameter than the larger diameter tubing of the upper portion of the inner probe conduit member and wherein said outer probe conduit tapers inwardly at its lower end to a diameter which fits loosely around said hypodermic syringe tubing.

6. A probe assembly as set forth in claim 4 wherein the upper end of said inner probe conduit member terminates in an annular flange which carries said seal forming means.

7. A probe assembly as set forth in claim 6 wherein said seal forming means comprises an O-ring.

8. A probe assembly as set forth in claim 7 wherein said outer probe conduit comprises a shoulder on the inner surface thereof and wherein said biasing means comprises a coil spring seated on said shoulder and bearing against the flange on said inner probe conduit member.

* * * * *